United States Patent
Morris et al.

(10) Patent No.: US 10,280,117 B2
(45) Date of Patent: May 7, 2019

(54) ADMIXTURE, FLOWABLE MATERIAL, HARDENED MATERIAL, AND METHOD OF MAKING THE SAME

(71) Applicants: Robert Douglas Morris, Burlington, NC (US); James Paul Johnson, Soddy Daisy, TN (US); Raymond W. Eley, Jr., Hillsborough, NC (US); Christopher Klee Baird Morris, Raleigh, NC (US)

(72) Inventors: Robert Douglas Morris, Burlington, NC (US); James Paul Johnson, Soddy Daisy, TN (US); Raymond W. Eley, Jr., Hillsborough, NC (US); Christopher Klee Baird Morris, Raleigh, NC (US)

(73) Assignee: SBC Group LLC, Hillsborough, NC (US)

( * ) Notice: Subject to any disclaimer, the term of this patent is extended or adjusted under 35 U.S.C. 154(b) by 283 days.

(21) Appl. No.: 14/946,062

(22) Filed: Nov. 19, 2015

(65) Prior Publication Data

US 2017/0144931 A1    May 25, 2017

(51) Int. Cl.
*C04B 18/24*    (2006.01)
*C04B 7/02*    (2006.01)
(Continued)

(52) U.S. Cl.
CPC ............. *C04B 18/248* (2013.01); *C04B 7/02* (2013.01); *C04B 14/28* (2013.01); *C04B 16/0691* (2013.01); *C04B 18/067* (2013.01)

(58) Field of Classification Search
CPC ......... C04B 18/248; C04B 7/02; C04B 14/28; C04B 16/0691; C04B 18/067
See application file for complete search history.

(56) References Cited

U.S. PATENT DOCUMENTS

| 7,347,896 B2 | 3/2008 | Harrison |
| 2002/0059886 A1 | 5/2002 | Merkley et al. |

(Continued)

FOREIGN PATENT DOCUMENTS

| WO | 2002006182 A1 | 1/2002 |
| WO | 2014135318 A1 | 9/2014 |

OTHER PUBLICATIONS

"OMYA (California)—Untreated Material Safety Data Sheet" OMYA (California) Inc., Apr. 22, 2003; entire document, but especially Section 1—Section 3.

(Continued)

*Primary Examiner* — John E Uselding
(74) *Attorney, Agent, or Firm* — IP Strategies

(57) ABSTRACT

An admixture includes a cementitious component, an unprocessed biomass component, calcium chloride, calcium carbonate, and an adhesive element. The admixture is suitable for mixing with water to form a flowable material that cures to produce a hardened material. A flowable material includes the admixture and water. A method of producing a flowable material includes turning on a mixer and adding an unprocessed biomass component to a drum of the mixer. The unprocessed biomass component is sprayed with an adhesive element to form a first composition. Calcium carbonate is added to the first composition in the mixing chamber, to form a second composition. The second composition is mixed. A cementitious component is added to the mixed second composition in the mixing chamber, to form a third composition, which is mixed with water and calcium chloride to produce the flowable material. The flowable material cures to form the hardened material.

9 Claims, 2 Drawing Sheets

(51) Int. Cl.
*C04B 14/28* (2006.01)
*C04B 16/06* (2006.01)
*C04B 18/06* (2006.01)

(56) References Cited

U.S. PATENT DOCUMENTS

| | | |
|---|---|---|
| 2002/0060282 A1 | 5/2002 | Shirakawa et al. |
| 2003/0082378 A1 | 5/2003 | Rieder et al. |
| 2004/0145078 A1 | 7/2004 | Merkley et al. |
| 2007/0089645 A1 | 4/2007 | Morton et al. |
| 2008/0282937 A1 | 11/2008 | Baker et al. |
| 2010/0294496 A1 | 11/2010 | Woytowich et al. |
| 2014/0187680 A1 | 7/2014 | Kripavicius |
| 2014/0352578 A1 | 12/2014 | Baker |

OTHER PUBLICATIONS

"Glenium 7700 Product Data Sheet" (BASF The Chemical Company), Jan. 2008; entire document, but especially description.

ADMIXTURE, FLOWABLE MATERIAL, HARDENED MATERIAL, AND METHOD OF MAKING THE SAME

FIELD OF THE INVENTION

The invention relates to formable hardened material made from flowable compositions, and methods of making such compositions.

BACKGROUND OF THE INVENTION

The construction industry relies heavily on the use of concrete and other hardened material made from cementitious-based components. This material typically is prepared from an admixture of mostly dry materials that is mixed with water to produce a flowable substance. The flowable substance can be formed into shapes and then cured until hardened. It this manner, hardened forms can be produced, to be used as building components, or the flowable material can be poured and cured to form a hardened surface.

Different materials in different proportions are used as admixture components depending on the physical qualities desired in the hardened material, such as strength, compression resistance, and flexibility.

Admixture components typically include a cementitious component, and may include other elements that improve the quality of the resulting hardened material or provide some ornamental value. For example, finely crushed glass can be included in the admixture to give the resulting hardened material a sheen. This is a good way to use material that is considered to be trash and would otherwise be dumped in a landfill. It would be advantageous to use other waste materials as part of the admixture, as long as the chosen material does not degrade the physical characteristics of the resulting hardened material.

Attempts have been made to use waste biomass material as an admixture component, with mixed results. Problems due to water exposure, including permeability, wicking, thaw resistance, and soaking damage are typically experienced when using hardened materials formed using such admixtures. Such biomass materials are readily available for use in admixtures, but the channels and voids present in typical biomass materials make it difficult to use in producing hardened materials that would be used in applications that would expose it to moisture. Different treatment of the biomass prior to inclusion in the admixture can result in limited success, but such treatment can be expensive and time-consuming while still resulting in an inferior hardened material product.

An admixture that includes a biomass component that can be used to produce a hardened material with satisfactory physical qualities that is simple and practical would be of great benefit to the construction industry and all industries that use such material.

BRIEF SUMMARY OF THE INVENTION

According to an aspect of the invention, an admixture includes at least one cementitious component, at least one unprocessed biomass component, calcium chloride, calcium carbonate, and an adhesive element. The admixture is suitable for mixing with water to form a flowable material that cures to produce a hardened material.

The cementitious component can include, for example, a Portland cement. The cementitious component can also, or instead, include slag. The unprocessed biomass component can include, for example, unprocessed rice hulls. The calcium carbonate can include, for example, limestone powder. The adhesive element can include, for example, a concrete bonding agent.

According to exemplary embodiments of the invention, the admixture can be composed according to the following ranges of components, as measured by weight the least one cementitious component in the range of about 600-1200 parts; the least one unprocessed biomass component in the range of about 50-300 parts; the calcium chloride in the range of about 3-50 parts; and the calcium carbonate in the range of about 50-450 parts. For example, the admixture can be composed according to the following ratio of components, as measured by weight: the at least one cementitious component, about 45 parts; the at least one unprocessed biomass component, about 6 parts; the calcium chloride, about 1 part; and the calcium carbonate, about 10 parts. The adhesive should be present in an amount sufficient to coat the biomass component.

The admixture can also include a pozzolan, a water reducer, and/or twisted nylon fibers. The pozzolan can include, for example, fly ash (pulverized fuel ash) and/or silica fume powder. The water reducer can include, for example, glenium.

According to another aspect of the invention, a flowable material includes an embodiment of the admixture described above, and water. For example, the flowable material can be composed according to the ratio of about 5-7 fluid ounces of the water for every 1 pound of the admixture.

According to another aspect of the invention, a hardened material includes the cured flowable material.

According to another aspect of the invention, a method of producing a flowable material includes turning on a mixer and adding an unprocessed biomass component to a mixing chamber or drum of the mixer. The unprocessed biomass component is sprayed with an adhesive element to form a first composition. Calcium carbonate is added to the first composition in the mixing chamber, to form a second composition. The second composition is mixed. A cementitious component is added to the mixed second composition in the mixing chamber, to form a third composition. Water and calcium chloride are added to the third composition. The water, the calcium chloride, and the third composition are mixed to produce the flowable material.

The mixer can be, for example, a twin-shaft mixer or a pan mixer. Turning on the mixer can include causing mixing blades of the mixer to rotate.

Preferably, the biomass component is sprayed with the adhesive element until it is coated. Spraying the unprocessed biomass component with the adhesive element can include, for example, using a misting sprayer. Twisted nylon fibers can also be added to the unprocessed biomass component in the mixing chamber and with the adhesive element to form the first composition.

The water can be a first quantity of water and the flowable material can be a first flowable material, in which case the method also includes adding a water reducer to the first flowable material in the mixing chamber to form a fourth composition, adding a second quantity of water to the fourth composition, and mixing the second quantity of water and the fourth composition to form a second flowable material. The water reducer can be, for example, glenium.

The cementitious component can include, for example, a Portland cement. The unprocessed biomass component can include, for example, unprocessed rice hulls. The calcium carbonate can include, for example, limestone powder. The adhesive element can include, for example, a concrete bonding agent.

According to exemplary embodiments of the method, the least one cementitious component can be added in the range of about 600-1200 parts by weight, the least one unprocessed biomass component can be added in the range of about 50-300 parts by weight, the calcium chloride can be added in the range of about 3-50 parts by weight, and the calcium carbonate can be added in the range of about 50-450 parts by weight. For example, the least one cementitious component can be added in an amount of about 45 parts by weight, the least one unprocessed biomass component can be added in an amount of about 6 parts by weight, the calcium chloride can be added in an amount of about 1 part by weight, and the calcium carbonate can be added in an amount of about 10 parts by weight.

A pozzolan can also be added to the first composition. The pozzolan can include, for example, fly ash and/or silica fume powder.

According to another aspect of the invention, a method of producing a hardened material includes allowing the flowable material to cure.

DETAILED DESCRIPTION OF THE INVENTION

Thus, the present invention includes biomass in place of aggregate and sand content present in typical concrete while maintaining the beneficial physical characteristics of concrete. The resulting hardened material can be used in place of conventional concrete, and actually provides improved properties compared to those of conventional concrete. For example, it has been observed that the resulting hardened material has high compressive and flexural strength, is thermal insulating, and is lightweight, to the extent that it is comparable or even better than conventional concrete.

Figure 1:
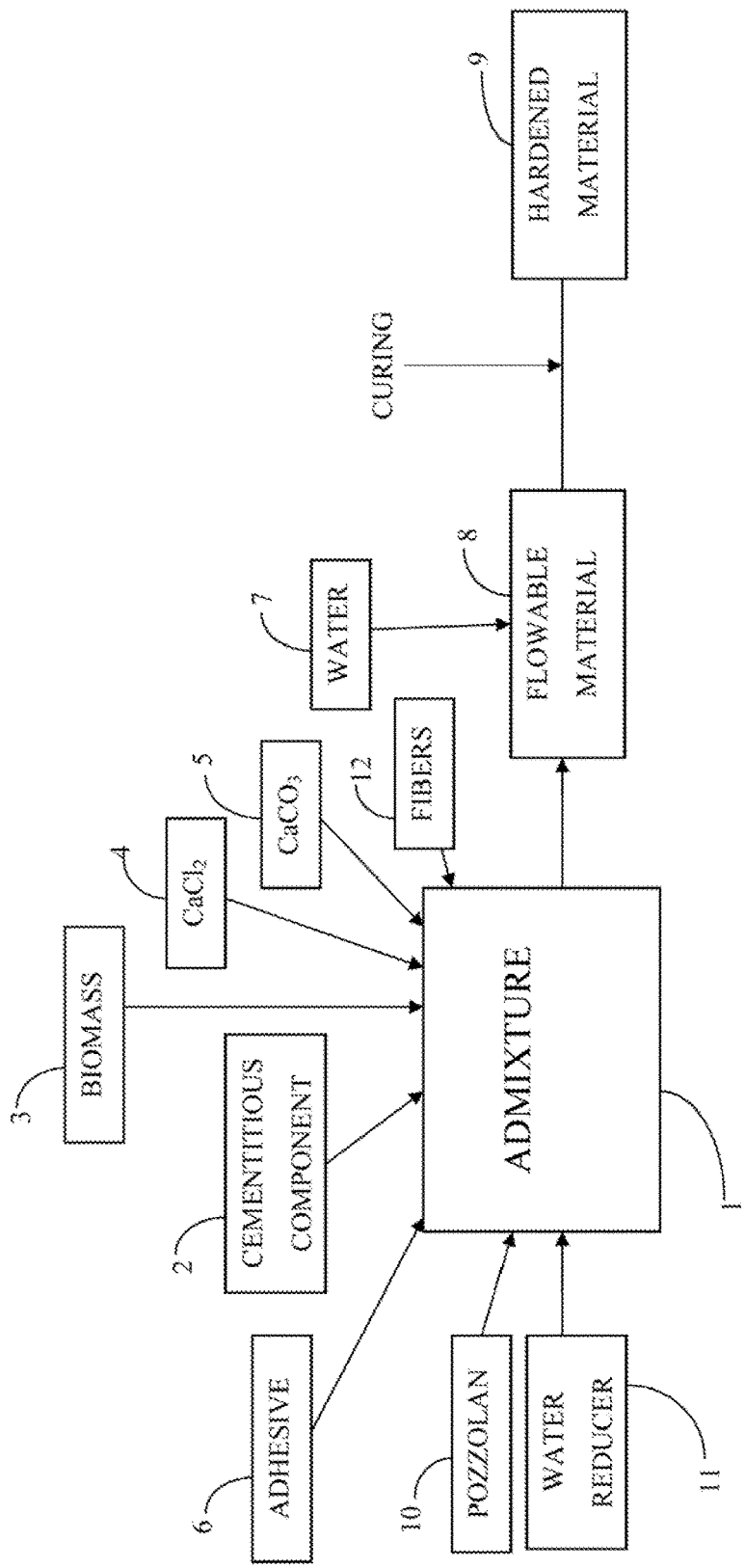
FIG. 1 is a schematic diagram showing components of the invention.

As shown in FIG. 1, a basic embodiment of the invention is an admixture 1, which includes a cementitious component 2, an unprocessed biomass component 3, calcium chloride 4, calcium carbonate 5, and an adhesive element 6.

The cementitious component 2 can be that typically used in the cement-derived material industry, or related fields such as the building industry. For example, the cementitious component 2 can be a mortar, slag, or a hydraulic cement, and preferably is a Portland cement. The cementitious component may also contain additional components such as are known to those of skill in the art, such as an optional accelerant to assist in the hardening process. Such additional components can be beneficial in some applications, but are not needed for all applications and therefore are not necessary ingredients of the most general embodiment of the invention.

The unprocessed biomass component 3 can include unprocessed rice hulls, that is, rice hulls that are raw and unchanged from the mill. Another unprocessed biomass component 3 contemplated for use as a component of the admixture is banana fiber. The calcium carbonate can include, for example, limestone powder.

The use of the calcium chloride 4 as an additive is not universally accepted for use in the U.S. as degrading some metal in which it comes into contact, such as reinforcing steel and post-tensioning cables. However, in applications in which cooperating elements are not affected by its use, the calcium chloride 4 is included as an ingredient in a manner known to those of skill in the art.

The calcium carbonate 5 is a limestone aggregate typically used in the concrete industry. The adhesive element 6 can include, for example, a concrete bonding agent.

As shown, when a quantity of water 7 is mixed with the admixture 1 disclosed, above, a flowable material 8 is formed, which then forms a hardened material 9 after curing. In some cases, the admixture 1 and water 7 can be mixed using equipment at a fixed location, to provide flowable material 8 used to produce hardened material 9 products for a particular application. For example, the flowable material 8 can be mixed in a manufacturing facility, to be cast for production of a hardened material 9 product, such as a railroad tie or siding for a house. Thus, these products can be made at a central facility and shipped to remote locations for use in particular applications. Alternatively, the mixing can be performed in a typical concrete mixer truck or other mobile unit so that mixing of the flowable material 8 can take place to be deposited at a pour site, where it will cure and harden in place as needed for that application.

In an exemplary embodiment of the invention, the admixture 1 can be composed according to the following ranges of components:
- cementitious component 2 in the range of about 600-1200 parts by weight
- unprocessed biomass component 3 in the range of about 50-300 parts by weight
- calcium chloride 4 in the range of about 3-50 parts by weight
- calcium carbonate 5 in the range of about 50-450 parts by weight
- adhesive element 6 in an amount sufficient to coat the unprocessed biomass component 3

For example, a particular exemplary admixture can be composed according to the following ratio of components:
- cementitious component 2, about 45 parts
- unprocessed biomass component 3, about 6 parts
- calcium chloride 4, about 1 part
- calcium carbonate 5, about 10 parts
- adhesive element 6 in an amount sufficient to coat the unprocessed biomass component 3

The admixture can also include a pozzolan 10 or other material siliceous or otherwise which, in itself, possesses little or no cementitious value but which will, in the presence of water, react chemically to form compounds possessing cementitious properties. The pozzolan 10 can include, for example, fly ash (pulverized fuel ash) and/or silica fume powder. Other optional components include a water reducer 11, such as glenium, and synthetic fibers, such as twisted nylon fibers 12.

As mentioned above, the flowable material includes the admixture mixed with water. For the particular admixture examples shown above, the flowable material can be composed according to the ratio of about 5-7 fluid ounces of the water for every pound of the admixture.

The examples above show ranges and ratios of components for a basic, general embodiment of the invention. Other exemplary embodiments, directed to specific applications, may be formulated according to different ranges and ratios, and optional additional components may be added.

Figure 2:
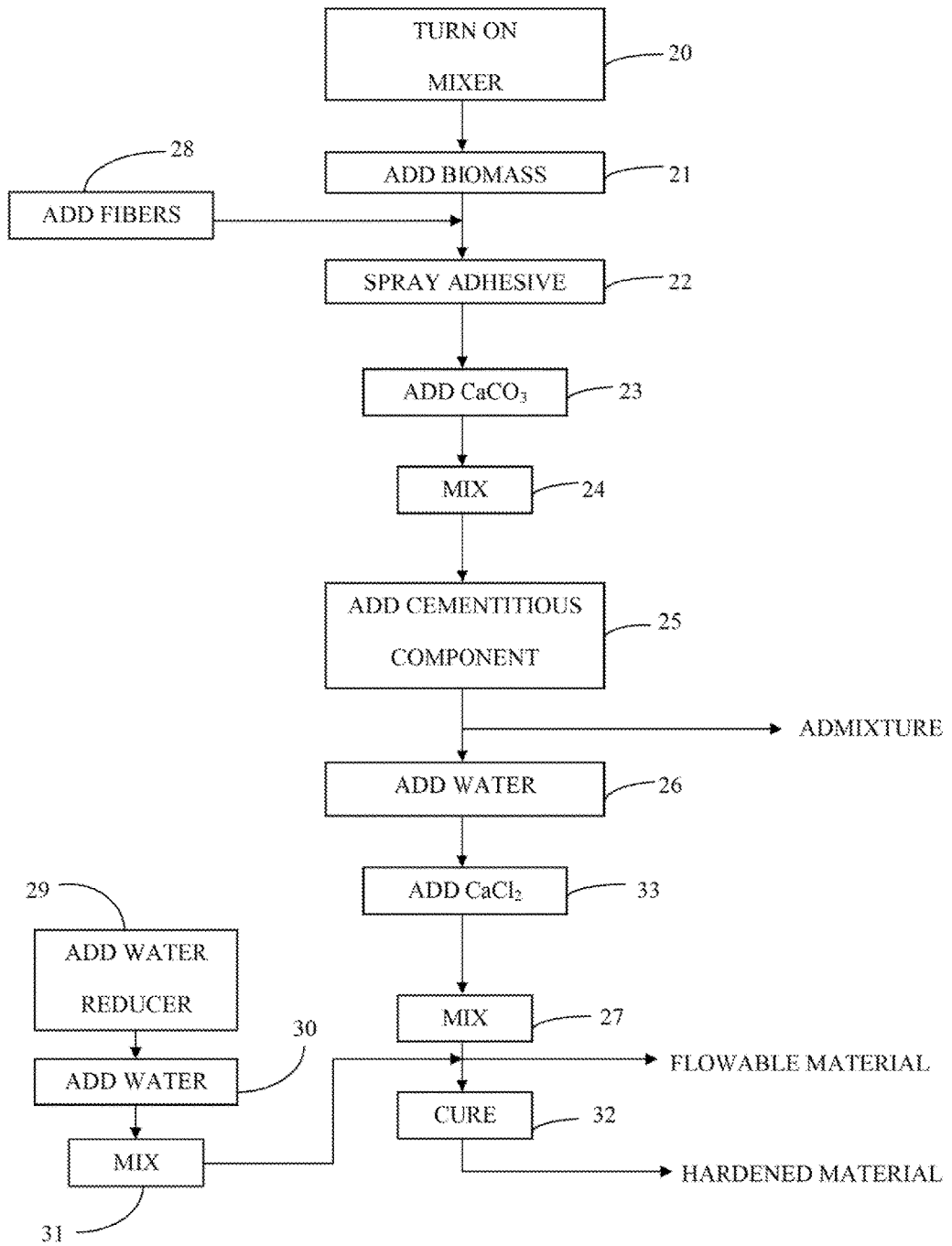
FIG. 2 is a flow diagram showing the method of the invention.

As shown in FIG. 2, the method of producing the flowable material includes turning on a mixer 20, causing the mixing blades of the mixer to rotate, and adding an unprocessed biomass component to a mixing chamber or drum of the mixer 21. Of course, the biomass may be placed in the drum 21 before turning on the mixer 20. The unprocessed biomass component is sprayed with an adhesive element 22, preferably to an extent that the biomass component is coated. Calcium carbonate is added 23 to mixing chamber, and mixing 24 continues. A cementitious component is added to the mixing chamber 25 and mixed in to complete the admixture. Water and calcium chloride are then added to the admixture 26, 33 and mixed 27 to produce, the flowable material.

The mixer can be a typical mixer used to mix concrete, such as a twin-shaft mixer or a pan mixer. For example, the Astec twin-shaft mixer, manufactured and sold by Astec Industries of Chattanooga, Tenn., is designed to mix aggregate, admixtures, cementitious materials, and water. The mixing paddles and shanks are mounted on the timed driving shafts, in equally spaced rows, opposing each other and counter-rotating during operation. The paddles are positioned in a unique pattern to drive material across and down mixer in a directed travel path over four times the lineal feet of the length of the mixer body.

These paddle positions are located at angles of 90 degrees and 45 degrees from the centerline of the driving shafts, and are installed so that each shaft has alternating rows of 45 degrees paddles in opposition to alternating rows of 90 degrees paddles. This produces a mixing pattern, called serpentine mixing, that simultaneously shears the consolidating constituent materials, drives the material across to the opposing side of the mixer, and pushes the plastic concrete toward the discharge opening of the mixer body.

Combined constituent materials enter the mixer body by means of conveyance through a material inlet water curtain utilizing continuously proportioned water in the required quantity sprayed in such a way to encircle the constituent materials flowing through the material inlet. The water curtain acts as a fugitive cement suppressant while it ensures that all pre-blended materials are lofted, agitated, and showered with precisely metered water.

A technical manual for the Hobart A-200 mixer is readily available, and provides details regarding a suitable twin-shaft mixer for use in carrying out the method of the invention. This manual is incorporated herein in its entirety. It will be appreciated by those of skill in the art that other mixers, similar or different, may be used with good results.

A high shear floor mixer, operated at or about 109 rpm, can approximate the effects of the twin shaft mixer and can be used advantageously in performing the method of the present invention.

Other mixing equipment can be used, such as high speed centrifugal mixers, for example. One advantage of the present inventive composition is that it can be substituted in place of conventional concrete not only in use but in the equipment used to apply concrete.

Preferably, the biomass component is sprayed 22 with the adhesive element until the biomass is coated, for example, using a misting sprayer. Optional twisted nylon fibers can also be added 28 to the unprocessed biomass component in the mixing chamber and sprayed with the adhesive element.

The water can be added in two quantities—a first quantity of water as described above, after which a water reducer is added 29 to the mixing chamber, and then a second quantity of water is added 30 and mixed 31 to form the flowable material. As noted above, the water reducer can be, for example, glenium.

Once the flowable material is composed, it can be poured to form according to the desired application and cured 32, producing the hardened material.

The examples above show ranges and ratios of components for a basic, general embodiment of the invention. Other exemplary embodiments, directed to specific applications, may be formulated according to different ranges and ratios, and optional additional components may be added, as described below.

Example—Railroad Tie/Sleeper

For this particular application, the admixture includes components in the following amounts;
Portland cement, 900 lbs.
Fly ash, 400 lbs.
Limestone powder, 200 lbs.
Unprocessed rice hulls, 118 lbs.
Silica fume powder, 16 lbs.
Concrete bonding agent, 1 gallon
Glenium, 50 oz.
Calcium chloride, 320 oz.
Twisted nylon fibers, 500 grams For this particular example, the admixture is formed by first turning on the mixer, and then adding the rice hulls and the nylon fibers. The hulls and fibers are then sprayed with the concrete bonding agent using a misting sprayer. Next, the limestone powder, silica fume powder, and calcium chloride are added to the mixer. The contents are then mixed, preferably for about 90 seconds. The Portland cement and fly ash are then added and mixed, along with 350 gallons of water. The glenium is then added and mixed, and 150 additional gallons of water are added. This composition is then mixed, preferably for 90 seconds, to produce the flowable material.

A hardened material product, in this case a railroad tie, is then produced. A railroad tie, or sleeper, is a rectangular support for the rails in railroad tracks. Generally laid perpendicular to the rails, the ties transfer loads to the track ballast and subgrade, and hold the rails upright and keep them spaced to the correct gauge.

First, a railroad tie form is assembled, for example by placing rail shoulders into form cut-outs. One inch of the flowable material is poured into the form, and then a layer of carbon fiber is place on the flowable material. Alternating one-inch layers of flowable material are poured and layers of carbon fiber are placed in the form to fabricate the tie mix, which should also be vibrated appropriately in a manner known to those of skill in the art. Preferably, two alternating layers of flowable material and carbon fiber are added to the form and then vibrated, followed by an additional layer of flowable material, another layer of carbon fiber, and then a four-inch layer of flowable material, after which the tie mix is vibrated again. A one-inch square head electric vibrator can be used, for example, to vibrate the tie mix. After vibration, the tie mix can cure, producing a hardened material product, in this case, a railroad tie, when the tie form is removed.

Similarly, other hardened material products can be fabricated by pouring the flowable material into other types of forms, molds, or casts, with or without the use of carbon fiber layers or other added materials. Alternatively, the flowable material can be poured on-site to fabricate a structure, such as foundation, floor, or countertop.

The present invention has been described by way of example and in terms of preferred embodiments. However, it is to be understood that the present invention is not strictly limited to the particularly disclosed embodiments. To the contrary, various modifications, as well as similar arrangements, are included within the spirit and scope of the present invention. The scope of the appended claims, therefore, should be accorded the broadest possible interpretation so as to encompass all such modifications and similar arrangements.

What is claimed is:

1. An admixture, comprising:
   at least one cementitious component;
   at least one unprocessed biomass component;
   calcium chloride;
   calcium carbonate; and
   an adhesive element;
   wherein the admixture is suitable for mixing with water to form a flowable material that cures to produce a hardened article;
   wherein:
      the cementitious component includes Portland cement;
      the at least one unprocessed biomass component includes unprocessed rice hulls;
      the calcium carbonate includes limestone powder; and
      the adhesive element includes a concrete bonding agent;
   the admixture further comprising:
      fly ash;
      silica fume powder;
      a water-reducing plasticizer; and
      twisted nylon fibers.

2. The admixture of claim 1, wherein the cementitious component includes slag.

3. The admixture of claim 1, composed according to the following ranges of components, as measured by weight:
   the at least one cementitious component in the range of about 600-1200 parts;
   the at least one unprocessed biomass component in the range of about 50-300 parts;
   the calcium chloride in the range of about 3-50 parts; and
   the calcium carbonate in the range of about 50-450 parts.

4. The admixture of claim 3, composed according to the following proportion of components, as measured by weight:
   the least one cementitious component, about 45 parts;
   the least one unprocessed biomass component, about 6 parts;
   the calcium chloride, about 1 part; and
   the calcium carbonate, about 10 parts.

5. A flowable material, comprising:
   the admixture of claim 1, and
   water.

6. A flowable material of claim 5, composed according to the ratio of about 5-7 fluid ounces of the water for every 1 pound of the admixture.

7. A hardened article, comprising the cured flowable material of claim 5.

8. The admixture of claim 1, composed proportionately as follows:
   the Portland cement, 900 lbs.;
   the fly ash, 400 lbs.;
   the limestone powder, 200 lbs.;
   the unprocessed rice hulls, 118 lbs.;
   the silica fume powder, 16 lbs.;
   the concrete bonding agent, 1 gallon;
   the water-reducing platicizer, 50 oz.;
   the calcium chloride, 320 oz.; and
   the twisted nylon fibers, 500 grams.

9. The hardened article of claim 7, comprising a railroad tie.

* * * * *